(12) United States Patent
Cordina et al.

(10) Patent No.: US 7,113,109 B2
(45) Date of Patent: Sep. 26, 2006

(54) VOICE ACTIVATED ALERTING SYSTEM FOR AIRCRAFT CREW

(75) Inventors: Joseph L. Cordina, Parker, TX (US); Anthony B. Couzelis, Plano, TX (US)

(73) Assignee: I-Tex Wireless,Inc., Parker, TX (US)

( * ) Notice: Subject to any disclaimer, the term of this patent is extended or adjusted under 35 U.S.C. 154(b) by 0 days.

(21) Appl. No.: 10/874,295

(22) Filed: Jun. 21, 2004

(65) Prior Publication Data

US 2004/0245409 A1     Dec. 9, 2004

Related U.S. Application Data

(63) Continuation-in-part of application No. 10/747,770, filed on Dec. 29, 2003, which is a continuation-in-part of application No. 10/017,547, filed on Dec. 14, 2001, now Pat. No. 6,676,078.

(60) Provisional application No. 60/551,598, filed on Mar. 8, 2004, provisional application No. 60/326,085, filed on Dec. 29, 2001.

(51) Int. Cl.
*G08B 21/00* (2006.01)

(52) U.S. Cl. ............... 340/945; 340/971; 340/539.11; 244/118.5

(58) Field of Classification Search .......... 340/945, 340/971, 539.1, 539.11, 573.1, 573.5, 573.7, 340/574, 426.17, 426.18; 244/121, 118.5; 709/203, 245
See application file for complete search history.

(56) References Cited

U.S. PATENT DOCUMENTS

| | | | | |
|---|---|---|---|---|
| 3,704,845 A | * | 12/1972 | Ord ........................... 244/121 |
| 4,549,047 A | * | 10/1985 | Brian et al. ............... 379/88.26 |
| 6,246,320 B1 | * | 6/2001 | Monroe ...................... 340/506 |
| 6,346,892 B1 | * | 2/2002 | DeMers et al. ............. 340/945 |
| 6,886,045 B1 | * | 4/2005 | Halasz et al. ............... 709/245 |

* cited by examiner

*Primary Examiner*—Van T. Trieu
(74) *Attorney, Agent, or Firm*—Michael L. Diaz

(57) ABSTRACT

A method and system for alerting an aircrew of terrorist activity in a cabin of an aircraft. When a terrorist or emergency situation is detected by a flight attendant, the flight attendant speaks an activation word, which turns the personal alert unit to an active mode. The flight attendant then says one or more specific words stored as a vocabulary within the personal alert unit. Upon recognition of a spoken word stored in the personal alert unit, the personal alert unit converts the recognized word or words into a signal sent to the cockpit via the ASU to the CDU. The CDU provides an indicator to the cockpit crew of the recognized words spoken by the flight attendant.

20 Claims, 4 Drawing Sheets

US 7,113,109 B2

VOICE ACTIVATED ALERTING SYSTEM FOR AIRCRAFT CREW

RELATED APPLICATIONS

This application claims the priority date of Provisional Patent Application Ser. No. 60/551,598 filed Mar. 8, 2004 and is a continuation-in-part of a co-pending patent application entitled "ALERTING SYSTEM FOR AIRCRAFT CREW" filed on Dec. 29, 2003 in the names of Joseph L. Cordina and Anthony B. Couzelis having a patent application Ser. No. 10/747,770 which is a continuation-in-part of a U.S. patent application Ser. No. 10/017,547 filed Dec. 14, 2001 now U.S. Pat. No. 6,676,078 entitled "SYSTEM AND METHOD FOR ALERTING A COCKPIT CREW OF TERRORIST ACTIVITY," in the names of Joseph L. Cordina and Anthony B. Couzelis which claims the priority date of Provisional Patent Application Ser. No. 60/326,085 filed Sep. 29, 2001 and is hereby incorporated in its entirety by reference herein.

BACKGROUND OF THE INVENTION

1. Technical Field of the Invention

This invention relates to alerting systems and, more particularly, to a system and method for alerting an aircrew of terrorist activities occurring in a cabin of an aircraft.

2. Description of Related Art

U.S. Pat. No. 6,676,078 to Cordina et al. (Cordina) discusses the threat of terrorism confronting commercial aviation. Cordina discloses a system for cabin crew members to alert the cockpit crew members of any terrorist activities occurring in the cabin. The system is a secure, wireless method of communicating with pilots through the use of a handheld personal alert unit having a plurality of buttons. The buttons enable a flight attendant to send coded messages to the cockpit. Although Cordina is a very effective first step in providing an alternate communication link between flight attendants and pilots, a system is needed which enables the flight attendant to more expeditiously and covertly signal the cockpit with more detailed text messaging of terrorist activity or any dangerous activity occurring in the cabin.

Thus, it would be a distinct advantage to have a system and method which provides a voice activated alert from cabin crew members to pilots within a cockpit when a dangerous incident is occurring. It is an object of the present invention to provide such a system and method.

SUMMARY OF THE INVENTION

In one aspect, the present invention is a system for alerting an aircrew of a dangerous situation occurring on an aircraft. The system includes a plurality of personal alert units. Each personal alert unit is carried by an authorized person located on the aircraft. The personal alert unit is capable of recognizing specific words spoken by the authorized person and transmitting a signal corresponding to the recognized specific words. A cockpit display unit (CDU), located within the cockpit of the aircraft, receives signals sent from the transmitting personal alert unit. When one of the authorized persons carrying the personal alert unit detects a dangerous situation and speaks one of the specific words recognizable by the personal alert unit, the personal alert unit sends a signal to the CDU. The CDU provides an indicator to a cockpit crew of the recognized specific word.

In another aspect, the present invention is a method of alerting an aircrew located in an aircraft of a dangerous activity on the aircraft. The method begins by a flight crew member carrying a personal alert unit. Upon detecting a dangerous situation, the flight crew member speaks a specific word. The personal alert unit recognizes the specific word spoken by the flight crew member and transmits a signal corresponding to the specific word from the personal alert unit to the CDU. An indication corresponding to the specific word is displayed on the CDU to the cockpit crew.

In still another aspect, the present invention is a personal alert unit for alerting an aircrew of a dangerous situation occurring on an aircraft through a cockpit display unit located within a cockpit of the aircraft. The personal alert unit includes a pocket emergency transmitter carried by an authorized person located on the aircraft and a microphone communicating with the pocket emergency transmitter. The microphone is also carried by the authorized person. The pocket emergency transmitter transmits signals to the cockpit display unit upon receipt of a specific recognized word spoken by the authorized person carrying the personal alert unit. The signal provides an indication corresponding to the specific word to alert the aircrew of a dangerous situation.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
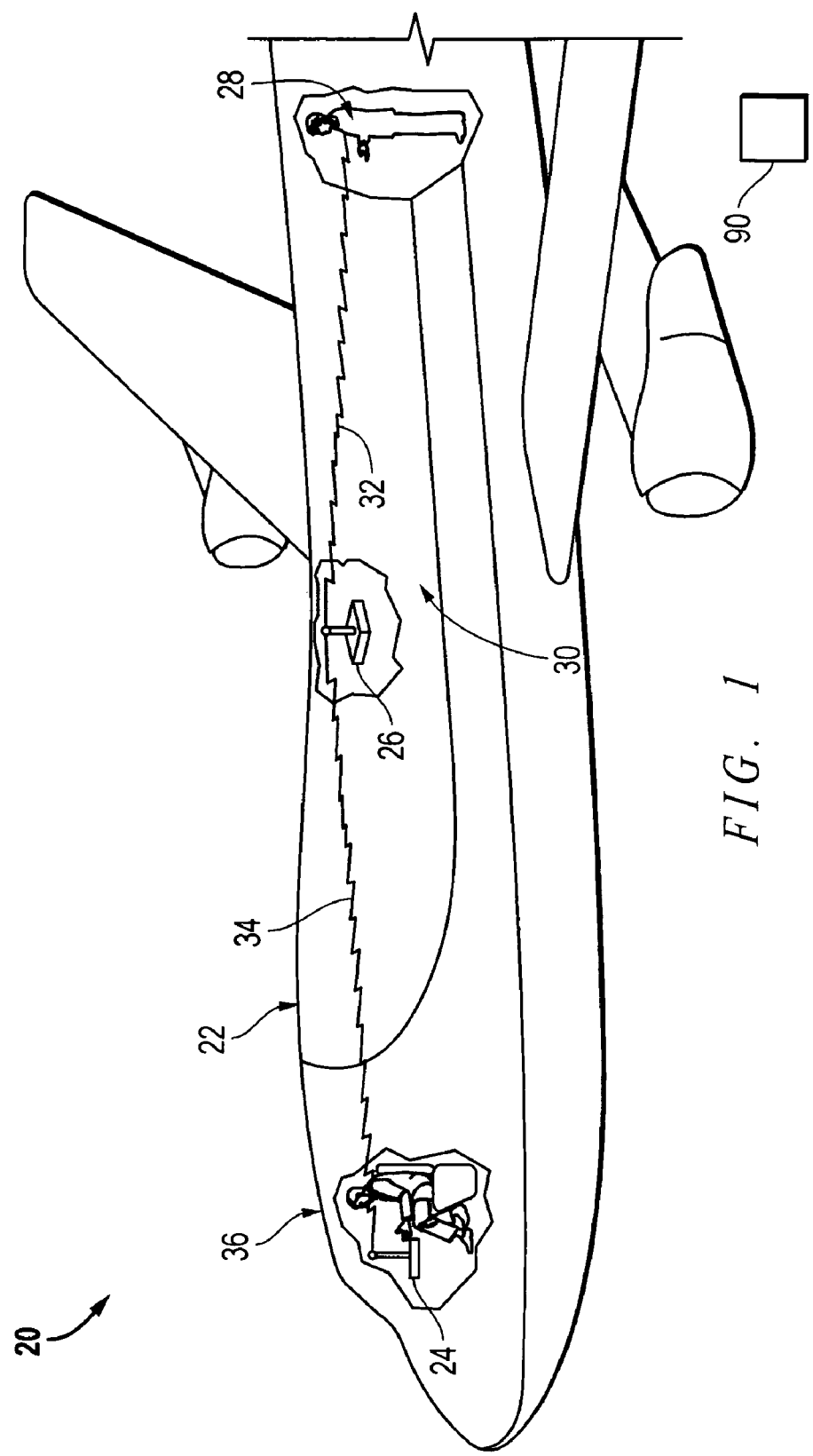
FIG. 1 is a simplified block diagram illustrating the components of an alert system in a preferred embodiment of the present invention.

The present invention is a system and method for alerting cabin crew members of dangerous incidences. FIG. 1 is a simplified block diagram illustrating the components of an alert system 20 in a preferred embodiment of the present invention. The alert system is installed on an aircraft 22 and includes a cockpit display unit (CDU) 24, at least one remote antenna sending unit (ASU) 26, and a plurality of personal alert units 28.

The plurality of personal alert units are carried by flight attendants within a passenger cabin area 30 and communicate with the ASU via a radio communications link 32. The ASU forwards any signals sent from any personal alert unit to the CDU via a radio communications link 34 located within a cockpit 36 where pilots control the aircraft 22. The CDU then provides a visual and aural warning to the cockpit for each received signal. The pilots may then take appropriate action to counteract any terrorist/hijacking attempt occurring on the aircraft. Additionally, the CDU may optionally broadcast, through the ASU, an alert signal to all the alerting devices located in the aircraft.

Figure 2:
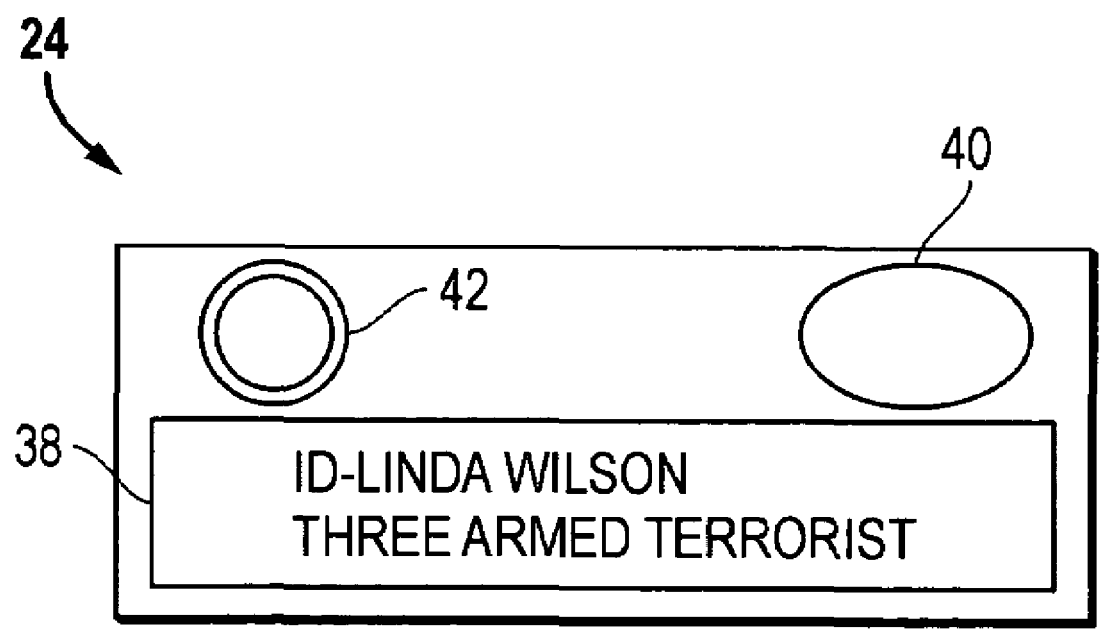
FIG. 2 is a front view of the CDU of FIG. 1 in the preferred embodiment of the present invention.

FIG. 2 is a front view of the CDU 24 of FIG. 1 in the preferred embodiment of the present invention. The CDU is a display unit having a receiver (not shown) for receiving any signals relayed from the ASU 26. Alternatively, the CDU may receive signals transmitted directly from a personal alert unit. The CDU is mounted within the cockpit 36 in such a position where the pilots may readily see any visual displays, such as the overhead panel of the cockpit. The CDU includes a visual display 38, a speaker 40, and a user interface buttons 42.

The visual display may provide any symbolism which may be used by the cockpit crew to indicate potential or actual dangerous situations occurring within the cabin area 30. In the preferred embodiment of the present invention, the visual display is a large, easily readable, backlit LCD having automatic dimming features common in many cockpit instruments. Preferably, the visual display will indicate a textual message for any received, recognized signal from the personal alert units or relayed through the ASU. For example, if an attempted hijacking is occurring, the visual display may indicate the specific personal alert unit sending the signal (e.g, "Linda Wilson," and any recognized vocabulary words spoken by the flight attendant carrying the personal alert unit). Additionally, the visual display may incorporate a "message-in-cue" feature which enables the pilot to view multiple messages sequentially by depressing the user interface buttons 42.

The CDU 24 also may provide an optional audible alert emitted through the speaker 40. The first signal received from each personal alert unit may actuate the audible alert to inform the pilots that a message is displayed on the visual display 38.

The CDU 24 may also provide a visual or aural display when any signals are detected by the ASU or directly to the CDU indicating that jamming or interference is being encountered. Any transmission received over a range near the frequency used by a transmitting personal alert unit may be detected through a receiver incorporated within the CDU.

In addition, the CDU 24 optionally may also, upon receipt of an alert signal from one personal alert unit, broadcast or relay an alert to all the personal alert units, informing the persons carrying the personal alert units of any dangerous activity.

The ASU is preferably located within a passenger cabin area 30, however, in alternate embodiments, the ASU may be located anywhere on the aircraft which allows communication with the plurality of personal alert units and the CDU.

The remote ASU 26 is preferably positioned within the cabin area 30, in such locations as allows reception of any personal alert unit's signals. In longer aircraft, such as the Boeing 777, a plurality of ASUs may be required to provide proper coverage of the entire cabin area. The ASU is preferably mounted at the ceiling within the cabin area. However, the ASU may be located anywhere which allows reception of the personal alert units. The ASU includes a receiver and a transmitter (not shown in FIG. 1). The receiver receives any transmitted signals from any personal alert units. The transmitter located within the ASU relays the received signals to the CDU 24 via the radio communications link 34.

Figure 3A:
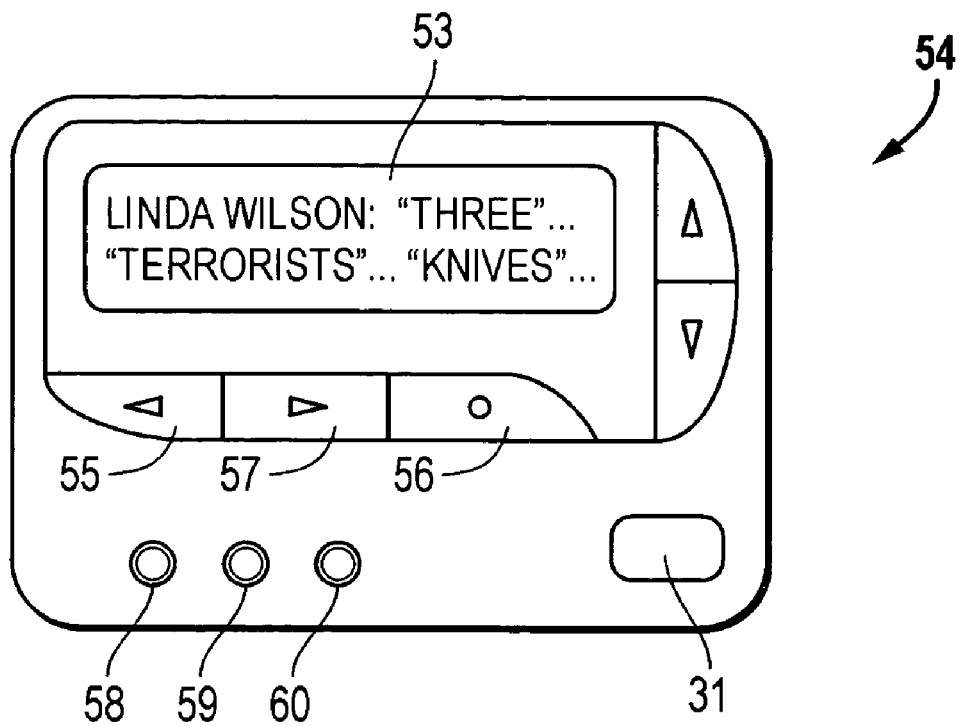
FIG. 3 is a front perspective view of the personal alert unit in the preferred embodiment of the present invention.
Figure 3B:
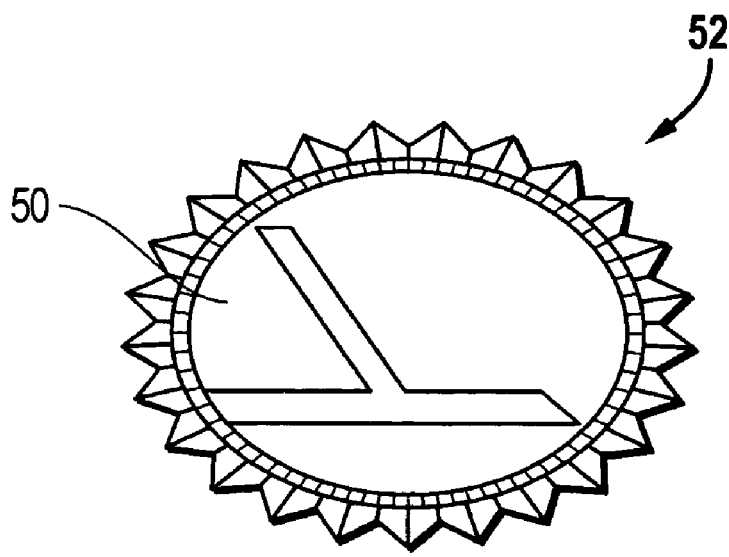

FIG. 3 is a front perspective view of the personal alert unit 28 in the preferred embodiment of the present invention. The personal alert unit includes a microphone 50 concealed in a jewelry piece 52 and a pocket emergency transmitter 54. The pocket emergency transmitter includes an on-off switch 56, a character display 53, LEDs 58, 59, and 60 (preferably one green, one yellow and one red), and in one embodiment, a flexible wire antenna (not shown; approximately six inches) and in a second embodiment, having no external antenna. The microphone preferably includes a wireless connection with the pocket emergency transmitter which is well known in the art of wireless communications. In an alternate embodiment the microphone is connected by a cable (not shown) to the personal emergency transmitter. The character display may be used to receive or display various messages. The pocket emergency transmitter may also include toggle switches 55 and 57 for displaying various text messages as desired.

The pocket emergency transmitter is a very small transmitting device which is battery powered (e.g., AAA batteries). The wire antenna 62 is approximately six inches in length and hangs from the personal emergency transmitter. In an alternate embodiment, the antenna is self-contained and hidden within the housing of the pocket emergency transmitter.

The personal alert unit (i.e., the pocket emergency transmitter) also contains a chip set (not shown) that includes a voice recognition system allowing the recognition of specific vocabulary words stored in a memory (not shown). The pocket emergency transmitter includes a microphone unit proximity detection feature which sends a message to the CDU when the microphone unit is out of range of the pocket emergency transmitter.

The LEDs 58 and 60 provide an indicator of the status of the unit (on/off) and battery level (e.g., green being a good battery). The yellow LED 59 indicates a self-test of the microphone. The yellow LED illuminates only momentarily on start up (when the slide switch is placed in the ON position). If the yellow LED remains illuminated and stays on, the LED indicates that a microphone battery (powering the microphone, not shown) battery level is low and the battery (preferably lithium) requires replacement as soon as possible. When the unit is transmitting words, one of the LEDs (e.g., red) will illuminate and flash accordingly. The red LED immediately flashes upon transmission of recognized words and ceases to flash when the last word is transmitted.

The personal alert unit 28 optionally may also include a vibrating mechanism (not shown), commonly used in paging units or mobile phones. In addition, in an alternate embodiment of the present invention, the personal alert unit may include a speaker 31 for emitting an aural alert. The vibrating mechanism may be used to inform each personal alert unit of an alert sent from another personal alert unit. The vibrating mechanism may also be used to indicate that a word was recognized by the personal alert unit and/or that the recognized word has been transmitted to the cockpit. In addition, the vibrating mechanism or the speaker may be used to provide an alert to the carrier that the personal alert unit is either out of range of the ASU or there is a system malfunction.

The personal alert unit 28 may optionally include a staging feature which sends any signal transmitted from the personal alert unit in multiple repetitive signals at random spacing to the CDU. This staging feature is employed for use until a feedback signal from the CDU is received acknowledging receipt of the signal sent from that specific personal alert unit.

Each personal alert unit may be initialized with the CDU during pre-flight, prior to boarding of passengers onto the aircraft 22. The personal alert unit may be initialized with the CDU by sliding the on-off switch 56 to the "ON" position or actuating an initialization button (not shown). The CDU, which is placed in the test mode by depressing the user interface buttons 42, receives a unique identity signal from the transmitting personal alert unit. The signal sent from the personal alert unit may provide data on the specific personal alert unit, allowing the CDU to recognize the personal alert unit's transmissions. The initialization of the personal alert units prevents misuse of unauthorized persons utilizing uninitialized personal alert units or from received personal alert unit signals transmitted from other aircraft.

On a bottom side of the personal alert unit, each personal alert unit may include a bar code to provide identification of each personal alert unit. Personal alert units are issued as personal items to each flight attendant, each personal alert unit may be associated through a code label upon the personal alert unit with a particular flight attendant.

In addition, the ASU contains a message staging feature. If the ASU receives multiple alerts simultaneously, the ASU cues up the received messages and forwards them in an orderly progression to the CDU. Messages fall into a CDU memory cue. As each message is viewed and cleared from the CDU's display, the next sequential message audibly alerts the pilot (if the message is the first alert from that specific pocket emergency transmitter). In addition, the pilot is visually alerted by a flashing light (preferably, a yellow caution light located on a front panel of the cockpit instrumentation panel) as well as displaying the next text message.

In addition, for each recognized word received by the personal emergency transmitter, a text of the recognized words is displayed on the character display. If multiple messages are received, the character display may display each message by optionally toggling the toggle switches 55 and 57.

Figure 4:
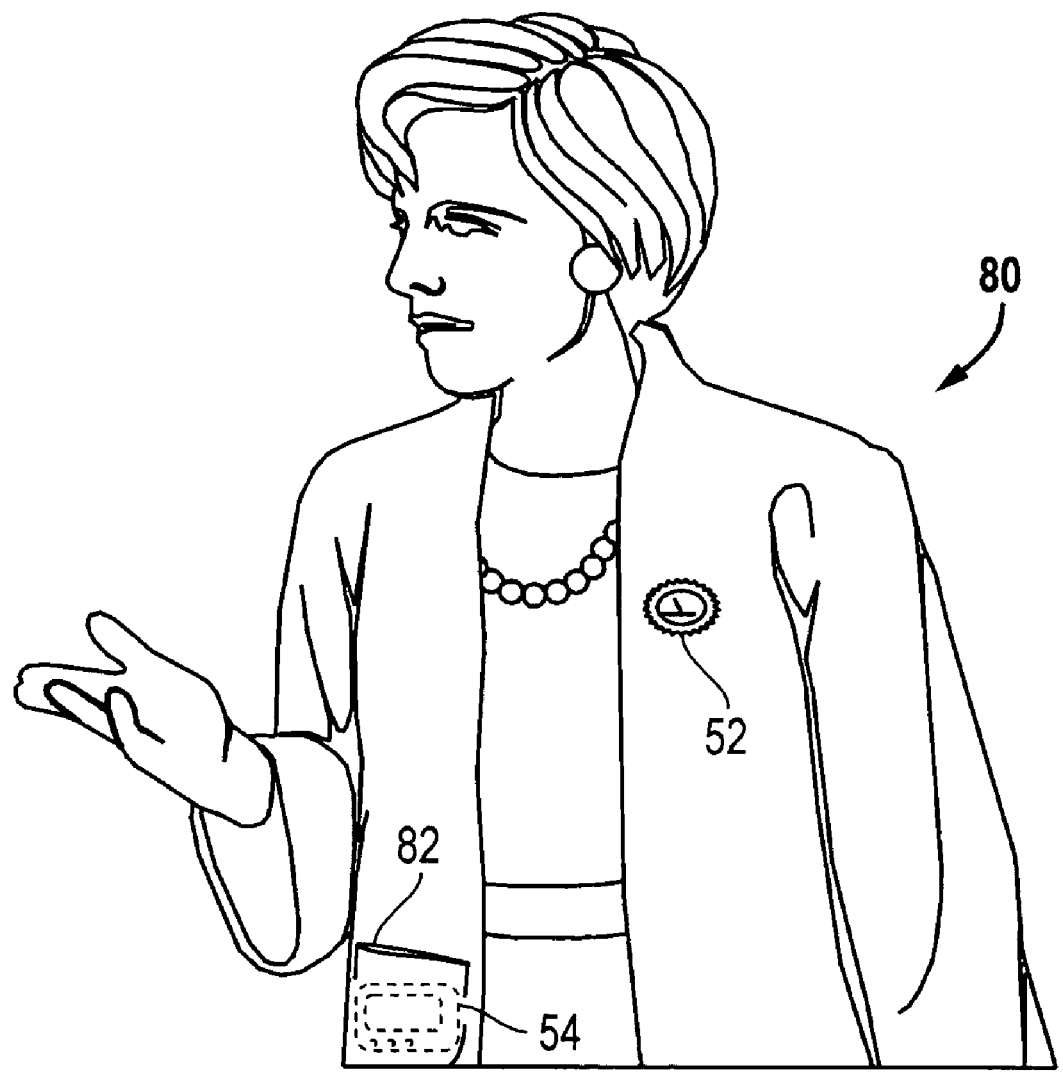
FIG. 4 is a front perspective view of a personal alert unit, configured as a brooch worn by a flight attendant 80 in the preferred embodiment of the present invention.

FIG. 4 is a front perspective view of a personal alert unit 28 worn by a flight attendant 80 in the preferred embodiment of the present invention. Preferably, the personal alert unit is carried by affixing the jewelry piece 52 to a lapel of the flight attendant. The pocket emergency transmitter 54 is then positioned within a pocket 82 of clothing worn by the flight attendant. However, in an alternate embodiment of the present invention, the personal alert unit may be integrated into one piece worn or carried by the flight attendant.

In order for the chip set in the pocket emergency transmitter 54 to recognize stored vocabulary (within the memory), the vocabulary must be inputted into the pocket emergency transmitter by means of a voice training equipment (VTE). The VTE enables a flight attendant to record defined vocabulary. The flight attendant records a word or a series of words which may be inputted into the VTE. The VTE is connected to the pocket emergency transmitter. The recorded vocabulary is then stored within the memory of the pocket emergency transmitter. In the preferred embodiment of the present invention, the memory will hold at least 300 words specific to flight operations and emergency situations. Preferably, the memory holds 900 words. The 900 words include three blocks of identical words. Each block of words are spoken by the operator in a different manner. For example, the blocks are in calm, excited and whisper voices. In addition, there will be a key emergency word, known as the "Q" word. The spoken Q word automatically turns on the alert system 20 allowing recognized word transmissions to be made to the ASU and on the CDU.

With reference to FIGS. 1–4, the operation of the alert system 20 will now be explained. Prior to use of the alert system 20, each personal alert unit must be trained to recognize the voice and specific words spoken by a flight attendant assigned to a specific personal alert unit. The pocket emergency transmitter 54 is connected to the VTE 90. The flight attendant records a specific vocabulary word into the VTE. The recording is played back and the flight attendant elects to accept or reject the recorded word. Upon acceptance of the recorded word, the vocabulary word is then stored in the memory of the pocket emergency transmitter. If necessary, additional words may be recorded into the memory at a later time. In addition, in the preferred embodiment of the present invention, the flight attendant records each word in different tones. For example, each word is spoken in an excited, calm and whispered tone.

Since the personal alert units each store personalized vocabulary specific to a particular flight attendant, the personal alert units are preferably controlled by each flight attendant. For example, the personal alert units may be considered as controlled items issued to each crew member. The crew member would then be responsible for the personal alert unit. The pocket emergency transmitter's correctly assigned crew member could be established by correlating a bar code or serial number located on the back side of the pocket emergency transmitter. Prior to each flight, each pocket emergency transmitter is initialized with the CDU 24. The CDU is placed in the initialization mode by depressing the user interface buttons 42. Each pocket emergency transmitter is initialized by sliding the on-off switch 56, or alternatively some other actuation mechanism associated with the personal alert unit. The pocket emergency transmitter sends a specific signal to the CDU identifying the specific pocket emergency transmitter. The pocket emergency transmitter's identification is held within the memory of the CDU for a particular length of time, in most cases 12 hours. Therefore, if the flight attendant works the same aircraft 22 on different flight segments, the pocket emergency transmitter does not require re-initialization. However, after the specified time has elapsed, the pocket emergency transmitter's identity is no longer recognized by the CDU. The dumping from the CDU's memory of the pocket emergency transmitter's identity automatically removes the personal alert unit from memory, thus eliminating the chance that the CDU associates the wrong pocket emergency transmitter with the aircraft.

Once the pocket emergency transmitter is initialized, the CDU, through the ASU, is able to accept signals from the initialized pocket emergency transmitters. Typically, the pocket emergency transmitters transmit a radio frequency (RF) signal. However, any type of signal may be utilized which allows the transmission and receipt of coded signals aboard an aircraft. Additionally, the CDU may also receive any extraneous signal sent from an uninitialized pocket emergency transmitter or a device attempting to jam the RF signal sent from another transmitter unit, such as may be employed by terrorists attempting to jam any signal sent from a flight attendant's personal alert unit. The CDU may inform the cockpit crew of such extraneous signals.

In the preferred embodiment of the present invention, the ASU or the CDU may receive any signal received from any initialized pocket emergency transmitter. During the flight, all flight attendants carry their assigned personal alert units with them at all times. As discussed above, the personal alert unit is preferably carried by the flight attendant. The microphone 50 is concealed in the jewelry piece in a position close to the mouth of the flight attendant, such as on the lapel. The pocket emergency transmitter is preferably concealed in a pocket of the flight attendant. However, the personal alert unit may be carried in any fashion which allows the microphone to hear words spoken by the flight attendant and hidden from view by passengers.

When any behavior for which a flight attendant deems to be hostile or belligerent by a passenger occurs, the flight attendant speaks the "Q" word, thus activating the personal alert unit 28. Prior to activation of the personal alert unit, the personal alert unit remains in a dormant state. While in the dormant state, the pocket emergency transmitter does not send any signal related to words spoken by the flight attendant. Thus, if the flight attendant speaks words stored in the memory, without first activating the personal alert unit 28 by saying the "Q" word, the pocket emergency transmitter does not send any signals to the ASU 26. However, once the "Q" word is spoken, the personal alert unit is placed in the active mode. Obviously, the "Q" word is preferably a word not normally spoken by the flight attendant.

While in the active mode, any words which are stored in the memory of the pocket emergency transmitter 54 and recognized by the chip set are transferred into a corresponding signal which is sent to the ASU. For example, after speaking the "Q" word, the flight attendant may state, "there are three terrorists with knifes in the cabin." The chip set recognizes the words, "three," "terrorists," "knifes," and "cabin." These words are converted by the chip set into signals to the ASU. In addition, while transmitting words, one of the LED's 58 or 60 may be illuminated. Additionally, the recognized words may be displayed on the character display 53. The vibrating mechanism may also vibrate the pocket emergency transmitter to notify the flight attendant that the word was recognized. The vibrating mechanism may optionally vibrate when each recognized word is transmitted to the ASU. In addition, the vibrating mechanism may vibrate in all pocket emergency transmitters of the other flight attendants on that flight. Thus, the other flight attendants are alerted to the transmission of recognized words by the actuated pocket emergency transmitter. The character display may also display the recognized words to the other pocket emergency transmitters. Thus, all flight attendants and the cockpit crew are informed of the dangerous situation.

The ASU 26 receives the signal from the pocket emergency transmitter via the radio communications link 32 and forwards the signal via the radio communications link 34 to the CDU 24. In another embodiment, the ASU(s) may be hard-wired to the CDU. The CDU interprets the transmitted signal and may provide a visual indication of the received signal on the visual display 38. For example, the visual display may indicate the specific pocket emergency transmitter transmitting and a text messaging of the recognized vocabulary words. The radio links between the personal alert unit, ASU, and CDU may all be RF transmissions. Additionally, the speaker 40 may emit an aural signal which may be silenced by a push-to-silence button. If multiple signals are received by different personal alert units, the CDU stores each signal within a memory unit (not shown) integral to the CDU. A cockpit crew member may then depress the user interface buttons 42 to display the next message held in cue within the memory unit of the CDU. Multiple messages may also be received from the same flight attendant. However, once the first message from a specific flight attendant is received and displayed, subsequent messages from that flight attendant alerts the pilots through a visual warning (preferably a flashing yellow "push-to-silence" lighted button), but no aural warning will be sounded. An additional feature permits the flight attendant to cycle the on-off switch on the pocket emergency transmitter from "on" to "off" and back to "on" which causes the next message sent by the flight attendant to activate both the aural warning and flashing yellow lighted switch.

Additionally, along with providing indicators to the cockpit, if properly initiated pocket emergency transmitter sends a signal to the ASU which is received by the CDU, the CDU may optionally send an alert signal to all the personal alert units, thus informing all the flight attendants that an alert has been issued by another crew member. Alternatively, the ASU, upon receipt of the alert signal from the initiating personal alert unit, may immediately relay the signal to both the CDU and all other personal alert units. Upon each personal alert unit receiving an alert signal, the personal alert unit may vibrate to inform the flight attendants of the dangerous situation. In addition, the pocket emergency transmitter may vibrate once the pilots have read the message in the CDU, thus providing a covert acknowledgment to the flight attendant that her message was received by the pilots. Additionally, the pocket emergency transmitter may vibrate upon successful transmission of spoken and recognized words to the ASU or CDU.

By determining that terrorist/hijacking attempts are occurring on the specific aircraft, steps can be taken early in the attempt to negate or diminish the damage done by the terrorists. Specifically, within the cabin, flight attendants may covertly provide surveillance of the situation in the cabin without alerting the dangerous individual/individuals.

In addition, the pocket emergency transmitter 54, at specific time intervals, may send a status signal to the ASU to inform the ASU of the status and readiness of the pocket emergency transmitter.

The pocket emergency transmitter 54 will continue to convert the received words which are recognized as vocabulary words to the ASU and then the CDU unit the flight attendant deactivates the personal alert unit by sliding the on-off switch 56 to the "off" position. Once the pocket emergency transmitter is turned on again, the personal alert unit is reset and in a dormant state.

In an alternate embodiment of the present invention, the pocket emergency transmitter may transmit audio signals to the ASU. Thus, upon saying the Q word, the pocket emergency transmitter may permit some or all of the words spoken by the flight attendant to be relayed to the cockpit for receipt by the pilots. In this manner, the pocket emergency transmitter may act as a one-way radio transmitter between the flight attendant and the cockpit.

In addition to receiving messages from the pocket emergency transmitters, the CDU may relay the received messages to ground based controllers or operations through the ACARS or transponder. For example, the recognized words may be relayed via ACARS as text messages to ground operations. In addition, when recognized words are received by the CDU, the transponder may be commanded to transmit a coded hijacking signal to air traffic controllers. In addition, the received messages may be stored in a voice or flight recorder found on commercial aircraft.

The present invention provides a system enabling covert communications with the cockpit. The communications is hands free and provides verbal words to be transmitted to the cockpit. Such warnings may be used by the cockpit to assist in defeating hijacking attempts on the aircraft.

It is thus believed that the operation and construction of the present invention will be apparent from the foregoing description. While the method and system shown and described have been characterized as being preferred, it will be readily apparent that various changes and modifications could be made therein without departing from the scope of the invention as defined in the following claims.

What is claimed is:

1. A system for alerting an aircrew of a dangerous situation occurring on an aircraft, the system comprising:
a plurality of personal alert units, each personal alert unit being carried by an authorized person located on the aircraft, the personal alert unit capable of recognizing specific words spoken by the authorized person and transmitting a signal corresponding to the recognized specific words; and a cockpit display unit (CDU) for receiving signals sent from the transmitting personal alert unit, the CDU located within a cockpit of the aircraft;

whereby one of the authorized persons carrying the personal alert unit detects a dangerous situation and speaks one of the specific words recognizable by the personal alert unit, upon receipt of a recognized specific word, the personal alert unit sends a signal to the CDU, the CDU providing an indicator to a cockpit crew of the recognized specific word.

2. The system for alerting an aircrew of claim 1 further comprising an antenna sending unit (ASU) located within a cabin of the aircraft, said ASU capable of communicating with each personal alert unit, said ASU forwarding any transmitted signals to the CDU.

3. The system for alerting an aircrew of claim 1 wherein each personal alert unit is capable of transmitting a plurality of specific codes, each code correlating to a specific recognized word.

4. The system for alerting an aircrew of claim 1 further comprising means for relaying the signal sent from the transmitting personal alert unit to ground-based personnel.

5. The system for alerting an aircrew of claim 4 wherein said means for relaying the signal includes emitting a transponder code from a transponder installed on the aircraft.

6. The system for alerting an aircrew of claim 4 wherein said means for relaying the signal includes sending an ACARS message from an ACARS unit installed on the aircraft to ground-based personnel.

7. The system for alerting an aircrew of claim 1 wherein said CDU includes means for detecting an attempt to jam a frequency used by the transmitting personal alert unit to send the signal to the CDU.

8. The system for alerting an aircrew of claim 1 wherein each fob includes a staging means providing multiple retransmission of the signal in a randomly timed spacing pattern.

9. The system for alerting an aircrew of claim 1 wherein the each personal alert unit, upon receipt of the recognized word from the CDU, provides an alert to the authorized persons.

10. The system for alerting an aircrew of claim 9 wherein the alert is a vibrating alert from a vibrating mechanism embedded within the personal alert unit.

11. The system for alerting an aircrew of claim 1 wherein the personal alert unit includes a character display for displaying each recognized word as a textual representation on the character display.

12. The system for alerting an aircrew of claim 1 wherein the personal alert unit includes a vibrating mechanism which vibrates upon recognition of a spoken word from the authorized person.

13. The system for alerting an aircrew of claim 12 wherein all the personal alert units vibrate upon receipt of a recognized word by the CDU.

14. The system for alerting an aircrew of claim 1 wherein the personal alert unit includes a pocket emergency transmitter and a microphone.

15. The system for alerting an aircrew of claim 1 wherein the personal alert unit only recognizes specific words after receipt of an alert word.

16. A method of alerting an aircrew located in an aircraft of a dangerous activity on the aircraft, said method comprising the steps of:

carrying at least one personal alert unit by a flight crew member during flight of the aircraft;

upon observing a dangerous activity on the aircraft, speaking by a flight crew member a specific word;

recognizing, by the personal alert unit, the specific word spoken by the flight crew member;

transmitting a signal corresponding to the specific word from the personal alert unit to the CDU; and displaying an indication corresponding to the specific word on the CDU to the cockpit crew.

17. The method of alerting an aircrew of claim 16 further comprising the step of, upon receipt of the signal by the CDU, broadcasting an alert signal to all the personal alert units to indicate that a dangerous activity has occurred aboard the aircraft.

18. The method of alerting an aircrew of claim 16 wherein the step of speaking a specific word includes speaking a specific action word to activate the personal alert unit, whereby activating the personal alert unit allows recognition of specific spoken words.

19. A personal alert unit for alerting an aircrew of a dangerous situation occurring on an aircraft through a cockpit display unit located within a cockpit of the aircraft, the personal alert unit comprising:

a pocket emergency transmitter carried by an authorized person located on the aircraft; and a microphone communicating with the pocket emergency transmitter, the microphone being carried by the authorized person;

the pocket emergency transmitter transmitting signals to the cockpit display unit upon receipt of a specific recognized word spoken by the authorized person carrying the personal alert unit, the signal providing an indication corresponding to the specific word to alert the aircrew of a dangerous situation.

20. The personal alert unit of claim 19 wherein the pocket emergency transmitter only recognizes specific words after receiving a specific action word spoken by the authorized person.

* * * * *